United States Patent
Oda

(10) Patent No.: US 6,426,493 B1
(45) Date of Patent: Jul. 30, 2002

(54) SOLID-STATE IMAGE PICKUP APPARATUS FOR READING OUT IMAGE SIGNALS WITH PIXELS REDUCED TO ONE-THIRD OR LESS IN A HORIZONTAL DIRECTION AND SIGNAL READING METHOD FOR THE SAME

(75) Inventor: Kazuya Oda, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 45 days.

(21) Appl. No.: 09/657,846

(22) Filed: Sep. 8, 2000

(30) Foreign Application Priority Data

Sep. 8, 1999 (JP) ............................................ 11-253904

(51) Int. Cl.[7] .............................................. H01L 27/00
(52) U.S. Cl. ...................... 250/208.1; 250/226; 348/322
(58) Field of Search ............................. 250/208.1, 226, 250/214 R, 214.1; 348/322, 315, 305, 272–275

(56) References Cited

U.S. PATENT DOCUMENTS 4,071,853 A * 1/1978 Yamanaka .................. 348/317

FOREIGN PATENT DOCUMENTS

JP        A10136391        5/1998

* cited by examiner

Primary Examiner—Que T. Le
(74) Attorney, Agent, or Firm—Birch, Stewart, Kolasch & Birch, LLP

(57) ABSTRACT

A solid state image pickup apparatus is implemented as a digital still camera including a color filter having a G (green) square, RB (red and blue) full-checker pattern. An image pickup section includes exclusive transfer electrodes for preliminary pickup in addition to conventional transfer electrodes. A signal feeding section feeds field shift gate pulses to the exclusive electrodes during preliminary pickup or feeds them to the conventional electrodes during actual to pickup following the preliminary pickup. As a result, during preliminary pickup, signal charges are read out via the exclusive electrodes while being reduced in the horizontal direction. The image pickup apparatus improves the signal output rate during preliminary pickup despite high pixel density, or high image quality, and reads out signals without effecting actual pickup to follow.

11 Claims, 5 Drawing Sheets

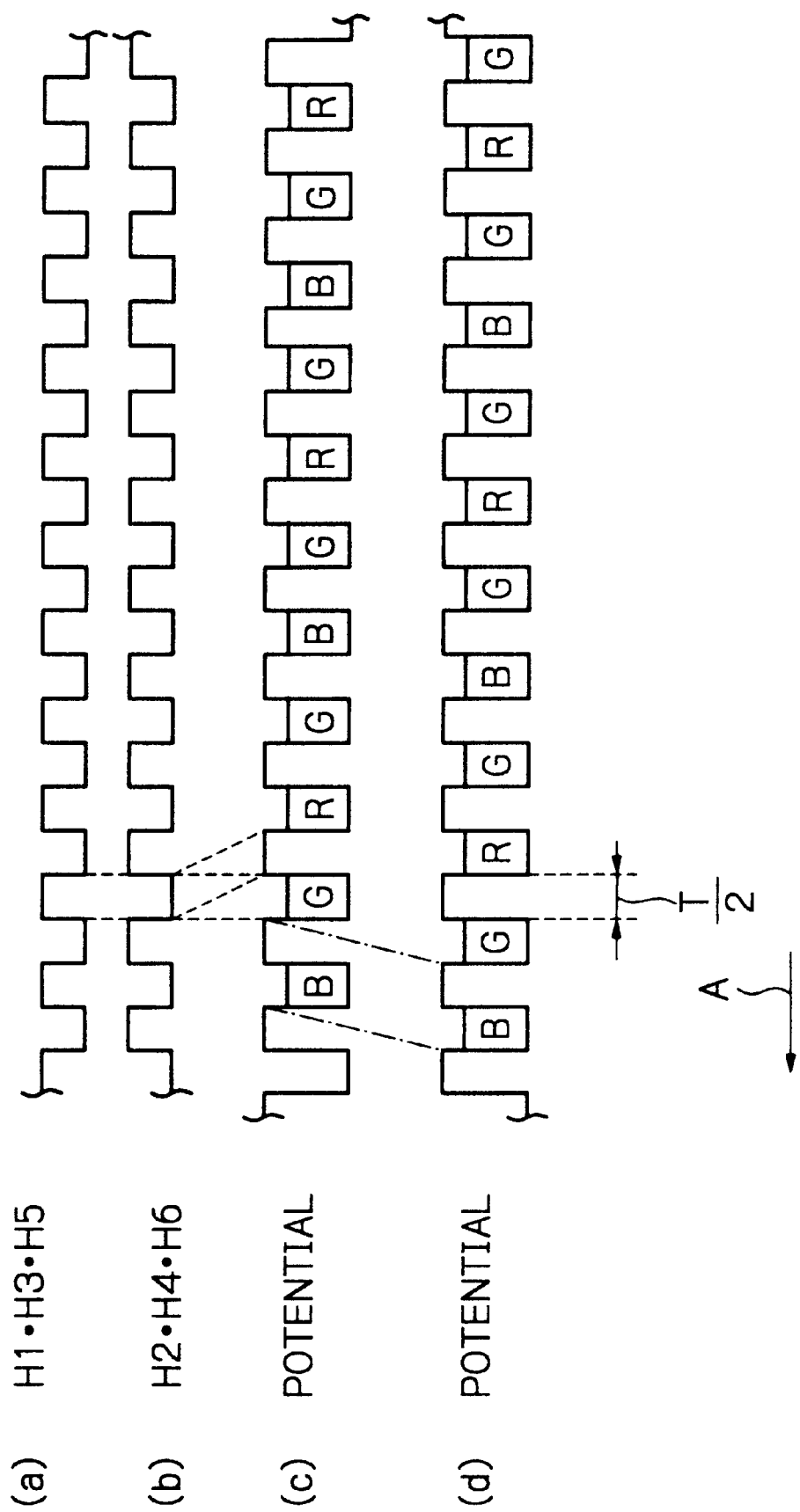

SOLID-STATE IMAGE PICKUP APPARATUS FOR READING OUT IMAGE SIGNALS WITH PIXELS REDUCED TO ONE-THIRD OR LESS IN A HORIZONTAL DIRECTION AND SIGNAL READING METHOD FOR THE SAME

BACKGROUND OF THE INVENTION

1. Field of the Invention

The present invention relates to a solid-state image pickup apparatus for reading out image signals with pixels reduced to one-third or less in a horizontal direction, and signal reading method for the same. The present invention is advantageously applicable to, e.g., a digital camera or an image input apparatus of the type including an image pickup device having high pixel density, e.g., more than several millions of pixels.

2. Description of the Background Art

To implement image quality comparable with one available with a silver halide photo-sensitive type of film, there have been proposed various technologies for increasing the number of pixels of a digital camera that electrically shoots a scene. Japanese patent laid-open publication No. 136391/1998 discloses a solid-state image pickup apparatus constructed to optimize the spatial sampling of an image, to shift pixels with respect to each other in such a manner as to enhance efficient receipt of light, and to reduce moiré and other aliasing signals.

A digital camera of the type including an image pickup device provided with high pixel density is extensively used and directed toward high image quality. It is a common practice with this type of digital camera to effect, before the actual pickup of a still picture, AE/AF (Automatic Exposure/Automatic Focusing) operation and movie drive that causes a scene being picked up to appear on an LCD (Liquid Crystal Display). This, however, brings about a problem that the high pixel density increases the period of time necessary for signal charges resulting from the pickup to be read out and thereby lowers the frame rate. It is to be noted that the high pixel density refers to more than 1,000,000 pixels or so-called megapixels.

To increase the frame rate, signal charges generated in the image pickup device may be read out while being reduced, or thinned, in the vertical direction. Specifically, assume that drive frequency CLK for reading out all of 1,500,000 pixels (1,280×1,024) by progressive scanning is 12.2725 MHz. Then, a single horizontal synchronizing period (1H) and a single vertical synchronizing period (1V) are 1,560 CLK and 1,050 H, respectively. The frame rate is therefore 1/7.5 second. When the signal charges are reduced to one-half in the vertical direction, 1H needs the same period of time while 1V is 525H, resulting in a frame rate of 66.7 milliseconds, i.e., 1/15 second. Even when the signal charges are reduced to one-fourth in the vertical direction, 1V is 262.6H, and therefore the frame rate is as long as 33.4 millisecond or 1/30 second.

Assume that 1,500,000 pixels are read out by progressive scanning and displayed by the movie drive in the conventional image size, i.e., 640×480. Then, the pixels are reduced to one-half in the horizontal and vertical directions under the above-described conditions. As a result, the number of pixels in the horizontal direction and the number of pixels (lines) in the vertical direction are as great as 640 and 525, respectively. Even the reduction to one-fourth implements only the reduction to one-half in the horizontal direction although reducing the number of pixels in the vertical direction to 262.5, i.e., improving the frame rate. However, because the number of pixels reduced in the vertical direction is short of 480, interpolation must be executed in the vertical direction in order to match the number of pixels to the desired number. On the other hand, in the horizontal direction, all of the 1,280 pixels are read out and then reduced to 640 pixels at the subsequent signal processing stage. It will therefore be seen that strict consideration is not given to the improvement in frame rate in reducing the pixels in the horizontal direction. This is apt to prevent the operator of the camera to miss an adequate actual pickup timing.

SUMMARY OF THE INVENTION

It is therefore an object of the present invention to provide a solid-state image pickup apparatus capable of improving the signal output rate during preliminary pickup despite high pixel density, or high image quality, and reading out signals without effecting actual pickup to follow, and a signal reading method for the same.

In accordance with the present invention, a solid-state image pickup apparatus includes an image pickup section and a signal feeding section. The image pickup section includes photosensitive cells arranged bidimensionally and each being shifted from adjoining photosensitive cells in the horizontal and vertical directions for photoelectrically transducing incident light. A color filter has color filter segments each being positioned in front of a particular photosensitive cell in the direction of light incidence for separating colors of incident light representative of a scene. First transfer electrodes each are assigned to a particular photosensitive cell for reading out a signal charge generated by the photosensitive cell. Second transfer electrodes each are assigned to a particular photosensitive cell arranged on at least every third column in the horizontal direction for reading out a signal charge generated by the photosensitive cell. The apparatus sequentially performs preliminary pickup and actual pickup, which reads all of the signal charges out of the photosensitive cells, and executes digital signal processing with the resulting signals. The signal feeding section feeds transfer timing signals for transferring, during preliminary pickup, signal charges output from the photosensitive cells arranged on at least every third column via the second transfer electrodes to vertical transfer paths, vertical drive signals for transferring the signal charges along the vertical transfer paths toward a horizontal transfer path perpendicular to the vertical transfer paths, and horizontal drive signals adjusted in timing for transferring the signal charges along the horizontal transfer path while maintaining the color of the individual signal charge.

Also, in a signal reading method in accordance with the present invention, read out are signal charges generated by photosensitive cells, which are arranged bidimensionally and each is shifted from adjoining photosensitive cells in the horizontal and vertical directions for photoelectrically transducing light of particular separated color incident thereto, in a particular manner for each of preliminary pickup and actual pickup. The method begins with the step of preparing first transfer electrodes each being assigned to a particular photosensitive cell for reading out a signal charge generated by the photosensitive cell. Second transfer electrodes each are assigned to a particular photosensitive cell arranged on at least every third column in the horizontal direction for reading out a signal charge generated by the photosensitive cell. Drive signals are generated for reading out signal charges generated by the photosensitive cells and representative of a shot. During the preliminary pickup, only said second transfer electrodes are rendered conductive by the drive signals, so that pixels are reduced in the horizontal direction. The signal charges read out via the second electrodes are vertically transferred in timed with the drive signals. The vertically transferred signal charges are horizontally transferred in timed with the drive signals adjusted in timing.

A signal reading method applicable to the above image pickup apparatus is also disclosed.

BRIEF DESCRIPTION OF THE DRAWINGS

The objects and features of the present invention will become more apparent from the consideration of the following detailed description taken in conjunction with the accompanying drawings in which:

FIG. 5 shows the phases of the horizontal drive signals shown in FIG. 4 and the variation of potential wells formed by the drive signals.

DESCRIPTION OF THE PREFERRED EMBODIMENT

Figure 1:
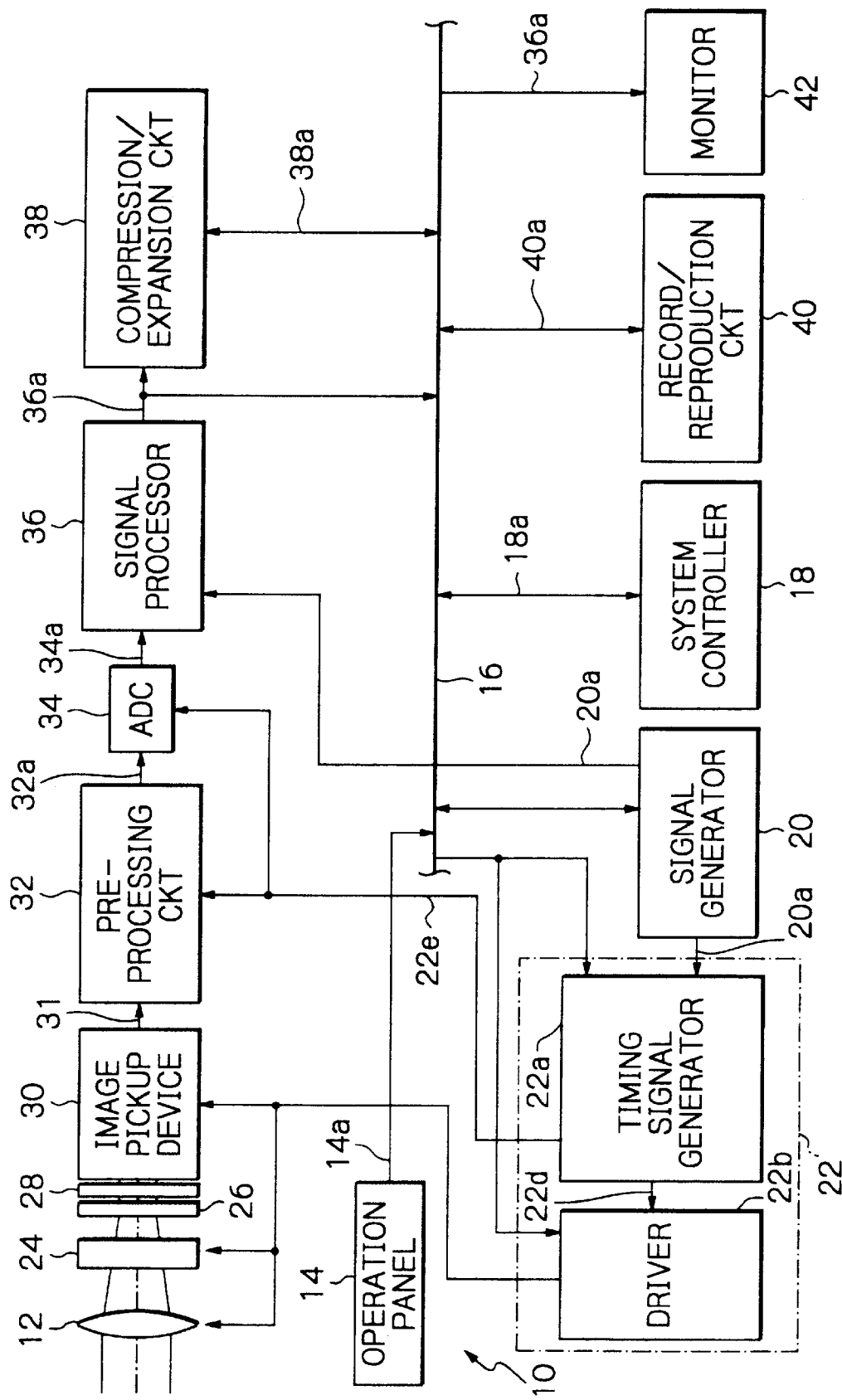
FIG. 1 is a block diagram schematically showing a solid-state image pickup apparatus embodying the present invention and implemented as a digital still camera.

Referring to FIG. 1 of the drawings, a solid-state image pickup apparatus embodying the present invention is shown and implemented as a digital still camera 10 by way of example. Part of the digital still camera 10 not relevant to the understanding of the present invention is not shown or described. In FIG. 1, signals are designated by the reference numerals attached to signal lines on which they appear. As shown, the camera 10 includes a lens system 12, an operation panel 14, a system controller 18, a signal generator 20, a timing signal feeding section 22, a diaphragm adjusting mechanism 24, an optical low-pass filter 26, and a color filter 28. The camera 10 further includes an image pickup device 30, a preprocessing circuit 32, an ADC (Analog-to-Digital Converter) 34, a signal processor 36, a compression/expansion circuit 38, a record/reproduction circuit 40, and a monitor 42.

The lens system 12 is representative of an assembly of a plurality of optical lenses and includes a zoom mechanism and an AF control mechanism although not shown specifically. The zoom mechanism controls the positions of the lenses and therefore the angle of field in accordance with a signal 14a output from the operation panel 14. The AF control mechanism automatically controls the focus on the basis of the distance between the camera 10 and a desired subject. The operation panel 14 includes a shutter release button, not shown, capable of being pressed to a half-stroke position and then to a full-stroke position. When the operator of the camera 10 presses the shutter release button to, e.g., the half-stroke position, the camera 10 preliminarily picks up a scene (preliminary pickup hereinafter) before actual pickup. The zoom mechanism and AF mechanism are controlled in accordance with information derived from the preliminary pickup. The signal 14a is also delivered to the system controller 18 over a system bus 16.

The timing signal feeding section 22 is made up of a timing signal generator 22a and a driver 22b. A drive signal 22c is fed to the lens system 12 via the signal generator 20, the timing signal generator 22a, and driver 22b. After the focus, exposure and so forth have been set on the basis of the information derived from the preliminary pickup, the operator presses the shutter release button to the full-stroke position in order to actually shoot the scene. The resulting pickup timing is fed to the system controller 18. In response, the system controller 18 executes pickup control including the image pickup and signal read-out.

The operation panel 14 allows the operator to select desired one of items that may be displayed on the monitor 42. The release shutter button sends the signal 14a to the system controller 18 via the system bus 16 such that the camera 10 operates in a particular manner in accordance with each of the half-stroke and full-stroke positions of the shutter release. In the illustrative embodiment, the operation panel 14 additionally includes a pointing device for indicating a cursor or a menu to be displayed on the monitor 42. The pointing device allows the operator to select desired modes in the event of various kinds of operation and processing. The signal 14a input to the system controller 18 is representative of various signals resulting from such functions available with the operation panel 14.

The system controller 18 includes, e.g., a CPU (Central Processing Unit) and a ROM (Read Only Memory) storing programs for operating the camera 10. The controller 18 generates control signals 18a meant for the various sections of the camera 10 in accordance with, e.g., information derived from the manipulation of the operation panel 14 and the programs stored in the ROM. Specifically, the control signals 18a are delivered not only to the signal generator 20 but also to the timing signal feed section 22, preprocessing circuit 32, ADC 34, signal processor 36, compression/expansion circuit 38, record/reproduction circuit 40, and monitor 42. Signal lines extending from the controller 18 to the blocks 22 and 32 through 42 are not shown in FIG. 1. While controlling the above various blocks, the controller 18 causes the timing signal feeding section 22 to generate particular timing signals for each of preliminary pickup and actual pickup via the bus 16. Further, the controller 18 executes unique control over the signal processor 36, as will be described specifically later.

The signal generator 20 includes an oscillator, not shown, for generating a system clock 20a under the control of the system controller 18. The system clock 20a is fed to the timing signal feed section 22 and signal processor 36. Also, the system clock 20a is applied to the system controller 18 on, e.g., the system bus 16 as a reference timing signal.

In the timing signal feeding section 22, the timing signal generator 22a includes a circuit for transforming, based on the control signal 18a, the system clock 20a to timing signals 22d used to control the various sections of the camera 10. The timing signals 22d include transfer shift gate pulses, vertical transfer timing signals, and horizontal transfer timing signals. Generally, each timing signal 22d is fed at a particular timing and provided with a particular frequency for each of preliminary pickup and actual pickup. For preliminary pickup, however, each timing signal 22d basically is not varied in frequency and is fed at a timing different from the timing assigned to actual pickup.

The image pickup device 30 includes photodiodes or photosensitive cells and transfer shift gates or transfer electrodes adjoining the photodiodes, as will be described specifically later with reference to FIG. 2. To vary the timings of the timing signals 22d, use is made of transfer shift gate pulses to be applied to the transfer shift gates. In an actual pickup mode, signal charges are read out of all of the photodiodes with which the color filter segments arranged in a G square, RB full-checker pattern, which will be described specifically later, are associated. At this instant, the transfer shift gate pulses are applied to first transfer electrodes or transfer shift gates $EL_1$ (see FIG. 2) that are customary with an image sensor.

In a preliminary pickup mode, the transfer shift gate pulses are fed to a different destination in order to distinguish the signal read-out in the preliminary pickup mode from the signal read-out effected via the first transfer electrodes $EL_1$ in the actual pickup mode. Because the destination is different, the transfer shift gate pulses are also different in timing from the transfer shift gate pulses assigned to the actual pickup mode. Specifically, second transfer electrodes or transfer shift gates $EL_2$ (see FIG. 2) different form the first transfer electrodes $EL_1$ are formed between the photodiodes and the vertical transfer paths. The positions of the second transfer electrodes $EL_2$ are determined by conditions for distinguishing the electrodes $EL_2$ from the electrodes $EL_1$, as will be described specifically later with reference to FIG. 2. In the preliminary pickup mode, timing signals are so generated as to apply the transfer shift gate pulses only to the second transfer electrodes $EL_2$.

As for vertical drive, the timing signal generator 22a generates vertical transfer timing signals implementing simultaneous reading of signal charges out of two lines, so that all of the three primary colors R, G and B appear together. In response to the timing signals, the driver 22b generates corresponding vertical drive signals. If vertical pixel reduction is not executed with importance attached to the fact that such vertical drive is used during actual pickup also, then signal charges may be read out line by line. Vertical pixel reduction should be executed such that the positional relation between the colors is preserved even after the simultaneous two-line read-out.

Paying attention to the positional relation between signal charges horizontally transferred, the illustrative embodiment handles six packets as a unit, which is three times as great as two packets dealt with as a unit during actual pickup. Stated another way, the transfer electrodes of the illustrative embodiment are structured in such a manner that e.g. every three electrodes hold a signal charge. In the illustrative embodiment, the timing signal generator 22a generates horizontal transfer timing signals that allow a signal charge to move over the every three packets or electrodes while maintaining the original drive phase. Because a horizontal transfer path HR (see FIG. 2) has a six-electrode structure and because two-phase drive is used, a timing that provides each three packets (one-half of six packets) with the same phase is desirable. This configuration will be described more specifically later.

Basically, the timing signal generator 22a generates the timing signals 22d and timing signals 22e under the control of the system controller 18 in accordance with pickup modes selected by the operator. The timing signals 22d and 22e are respectively delivered to the driver 22b and various sections of the camera 10, as shown in FIG. 1. The driver 22b superposes the various timing signals to thereby generate drive signals 22c. The drive signals 22c are fed not only to the zoom control mechanism and AF control mechanism included in the lens system 12, but also to the diaphragm control 24 and image pickup device 30. The driver 22b may also be directly controlled by the system controller 18. Alternatively, the controller 18 may inhibit the driver 22b from superposing the field shift gate pulses on the drive signal 22c to be applied to the columns whose signal charges should not be read out.

The diaphragm control mechanism 24 controls the sectional area of an incident beam, i.e., a lens opening such that an optimal beam is incident to the image pickup device 30. The driver 22b feeds the drive signal 22c to the diaphragm control mechanism 24 also. The drive signal 22c causes the mechanism 24 to operate under the control of the system controller 18. The system controller 18 calculates a lens opening and an exposure time on the basis of signal charges output from the image pickup device 30 (AE processing), although not shown specifically. Control signals 18a representative of the calculated lens opening and exposure time are input to the timing signal generator 22a. In response, the timing signal generator 22a feeds the timing signal 22d to the driver 22b and causes it to deliver the corresponding drive signal 22c to the diaphragm control mechanism 24.

The image pickup device 30 has the previously mentioned photodiodes, or photosensitive cells, arranged in a plane perpendicular to the optical axis of the lens system 12. The optical low-pass filter 26 and color filter are integrally arranged in front of the photodiodes in the direction of light incidence. The low-pass filter 26 limits the spatial frequency of an optical image to below the Nyquist frequency. The color filter 28 has filter segments corresponding one-to-one to the photodiodes and effects color separation. In the illustrative embodiment, the color filter is implemented by a single plate. The configuration of the image pickup device 30, including the color filter, will be described more specifically later.

The image pickup device 30 may be implemented by a CCD (Charge Coupled Device) image sensor or a MOS (Metal Oxide Semiconductor) image sensor by way of example. The image pickup device 30 reads out signal charges generated by the photodiodes in a particular manner in each of the preliminary pickup mode and actual pickup mode. The signal charges are fed from the image pickup device 30 to the preprocessing circuit 32.

In the illustrative embodiment, the color filter has a so-called honeycomb arrangement and has G filter segments arranged in a square lattice pattern and R and B filter segments arranged in a full-checker pattern. Let this filter arrangement be referred to as a G square (lattice), RB full-checker pattern (see FIG. 2).

The preprocessing circuit 32 includes a CDS (Correlated Double Sampling) section not shown. In the case where the image pickup device 30 is implemented by a CCD image sensor, the CDS section includes a clamp circuit and a sample and hold circuit. The clamp circuit clamps various kinds of noise ascribable to the image sensor in synchronism with a timing signal 22e output from the timing signal generator 22a. The sample and hold circuit samples and holds the signal charges in synchronism with the timing signal 22e. The CDS circuit delivers the resulting noise-free signals 32a to the ADC 34.

The ADC 34 quantizes the signal levels of the analog signals, or signal charges, 32a by use of a preselected quantizing level and thereby converts them to digital signals 34a. The ADC 34 delivers the digital signals 34a to the signal processor 36 in synchronism with a conversion timing clock or similar timing signal 22e output from the timing signal generator 22a.

The signal processor 36 includes a data correcting circuit, a luminance data generator, a luminance data interpolator, a high resolution, plane interpolator and a matrix processing circuit although not shown specifically. With these circuits, the signal processing 36 further enhances the quality of an image. The data correcting circuit includes a gamma correction circuit for color correction and an AWB (Automatic White Balance) circuit for automatic white balance control. The gamma correction circuit uses lookup tables listing a plurality of sets of data, i.e., digital signals to be input to a ROM and correction data to be output in accordance with the digital signals. While the data correcting circuit may be included in circuitry following the signal processor 36, it should preferably be included in the signal processor 36 in order to minimize the number of look-up tables. Such data correction is also effected in synchronism with a timing signal output from the timing signal generator 22a. The data correcting circuit delivers the correction data to the luminance data generator.

The luminance data generator operates under the control of the system controller 18. For example, this data generator weights the correction data in consideration of the arrangement of colors to thereby generate luminance data Y for pixels where the photodiodes are positioned. The luminance data Y are fed to the luminance data interpolator. The luminance data interpolator interpolates luminance data in virtual pixels each intervening between nearby luminance data Y, thereby generating plane luminance data $Y_h$. The plane luminance data $Y_h$ are delivered to the high resolution, plane interpolator.

The high resolution, plane interpolator generates R plane data, G plane data and B plane data on the basis of the plane luminance data $Y_h$ and corrected R, G and B pixel data input thereto. The R, G and B plane data are fed to the matrix processor. The plane interpolator includes memories for respectively storing the processed image data and allowing them to be read out in a nondestructive way. The plane interpolator calculates pixel data by reading the pixel data out of the memories.

The matrix processor transforms the R, G and B plane data to luminance data Y and chrominance data (R−Y) and (B−Y) capable of being displayed on the monitor 42. Specifically, the matrix processor multiplies each of the R, G and B plane data by a particular mixture ratio to thereby output the luminance data Y and chrominance data (R−Y) and (B−Y). To determine mixture ratios, use is made of conventional coefficients. A cutoff frequency containing the frequency bands of the luminance data Y and chrominance data (R−Y) and (B−Y) and not causing aliasing to occur is set in order to execute antialiasing processing. The luminance data Y are fed to an aperture adjusting section and have their high frequencies raised thereby. As a result, the contour of the image is enhanced. The matrix processor delivers the luminance data Y and chrominance data (R−Y) and (B−Y), or Cr and Cb, (36a) to the compression/expansion circuit 38 while delivering them to the monitor 42 on the system bus 16.

As stated above, the signal processor 36 generates the luminance data Y and chrominance data Cr and Cb 36a by using, among the pixel data output from the photodiodes, the pixel data having close correlation by way of example.

The compression/expansion circuit 38 is made up of a circuit for compressing image data with the JPEG (Joint Photographic Experts Group) scheme, and a circuit for expanding the compressed image data. During recording, the compression/expansion circuit 38 delivers compressed data 38a to the record/reproduction circuit 40 on the system bus 16 under the control of the system controller 18. Alternatively, the compression/expansion circuit 38 may simply pass the data 36a output from the signal processor 36 therethrough and transfer them to the monitor 42 on the system bus 16 under the control of the system controller 18. During reproduction, the compression/expansion circuit 38 receives data 40a read out of the record/reproduction circuit 40 on the system bus 16 and expands them. The expanded data are also fed to the monitor 42 and displayed thereby.

The record/reproduction circuit 40 is made up of a recording section for writing image data in a recording medium and a reproducing section for reading image data out of the recording medium. The recording medium may be implemented by a so-called smart medium or similar semiconductor memory, a magnetic disk or an optical disk by way of example. When use is made of a magnetic disk or an optical disk, the record/reproduction circuit 40 includes a modulator for modulating image data and a head for writing the modulated image data in the disk.

The monitor 42 displays, under the control of the system controller 18, the luminance data and chrominance data 36a or the R, G and B data 36a while taking account of its screen size and adjusting the timing. When the monitor 42 is implemented by an LCD (Liquid Crystal Display) and displays a moving picture, it displays, during preliminary pickup by way of example, an image reduced to one-third in the number of photodiodes or pixels in the horizontal direction.

With the above-described configuration, the camera 10 adequately controls each of preliminary pickup and actual pickup in a particular manner despite that the image pickup device 30 has high pixel density. Specifically, during preliminary pickup, the camera 10 reads out signals at high speed in order to rapidly set up exposure conditions for actual pickup to follow. During actual pickup, the camera 10 reads out all signal charges by progressive scanning in order to enhance the quality of the entire picture.

Figure 2:
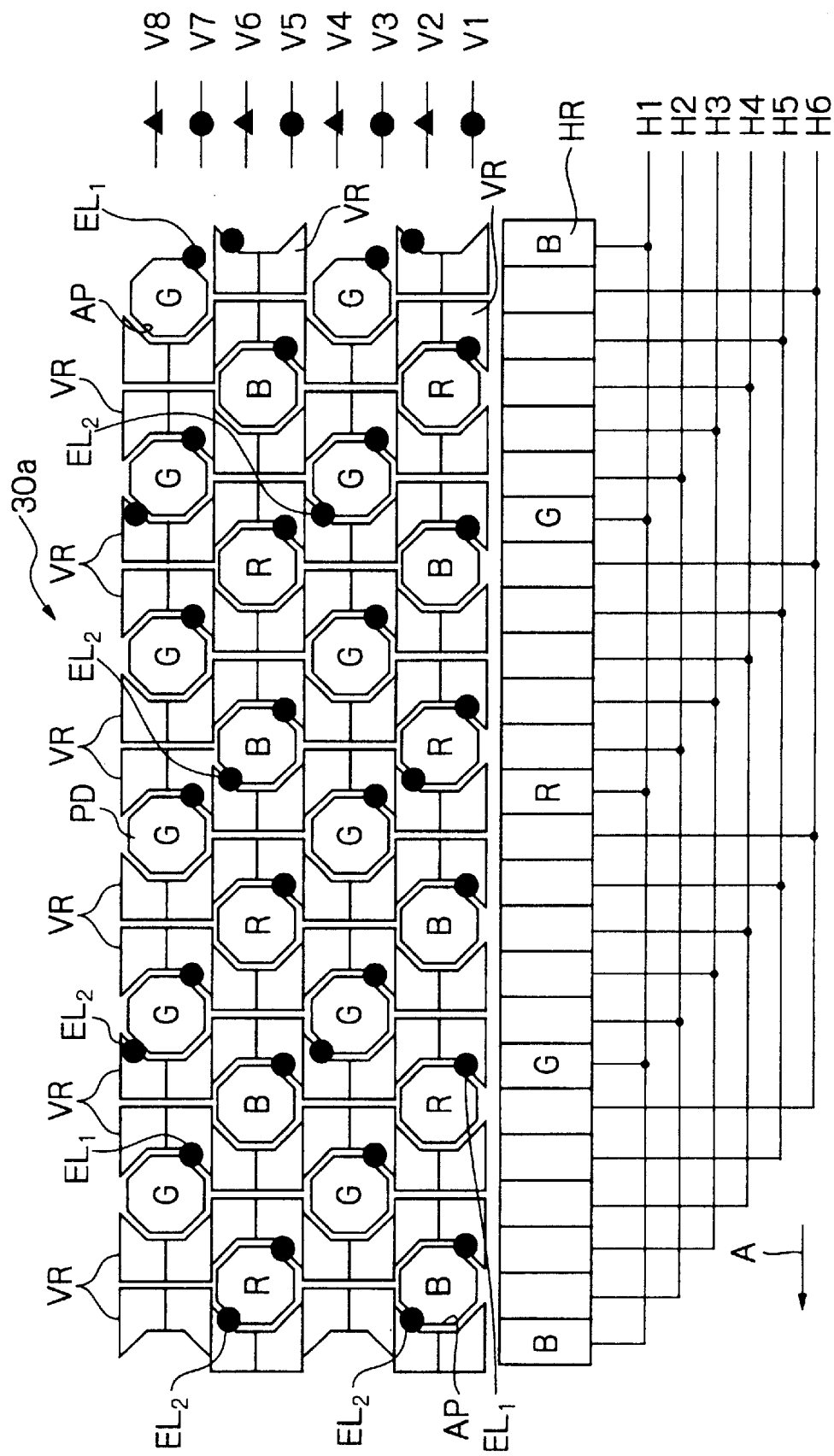
FIG. 2 is a schematic view showing the photosensitive array of an image pickup section included in the illustrative embodiment, as seen from the light incidence side, together with a relation between signal charges transferred in the horizontal direction and a relation between horizontal drive signals.

Reference will be made to FIG. 2 for describing the image pickup device 30 and color filter 28 specifically. FIG. 2 shows a positional relation between the photosensitive array of the image pickup device 30 and vertical transfer drive signals V1 through V8 output from the driver 22b. As shown, the image pickup 30 includes photosensitive portions 30a in which photodiodes or photosensitive cells PD are arranged bidimensionally for photoelectrically transducing incident light. Each photodiode PD is shifted from the adjoining photodiodes PD in the vertical and horizontal directions, as illustrated. The photosensitive portions 30a each are formed with an aperture AP in the front thereof. The previously mentioned first transfer electrodes $EL_1$ are so arranged as to skirt round the apertures AP, so that signal charges can be read out of the photodiodes PD in the actual pickup mode. The second transfer electrodes $EL_2$ are arranged on every third column in order to read signal charges out of the photodiodes PD in the preliminary pickup mode. The signals read out via the electrodes $EL_1$ or $EL_2$ are vertically transferred along vertical transfer registers or vertical transfer paths VR and then horizontally transferred along horizontal transfer registers or horizontal transfer path HR perpendicular to the vertical transfer paths VR.

The vertical transfer registers VR transfer the signals in accordance with the vertical transfer drive signals V1 through V8. Specifically, four vertical transfer registers or electrodes VR are assigned to each photosensitive portion 30a. Each photosensitive portion 30a has two regions, or registers VR, adjoining each other in the horizontal direction, i.e., when the photodiodes PD shifted from each other are seen in the horizontal direction. The two adjoining regions refer to two packets. The horizontal transfer registers HR each have, for example, six electrodes operative as a unit in matching relation to the above arrangement of the vertical transfer registers VR in the actual pickup mode.

In the illustrative embodiment, the apertures AP are formed in the image pickup device 30 in a honeycomb pattern, and each has an octagonal shape. While the apertures AP generally have a square lattice configuration, the crux is that the apertures AP be capable of enhancing sensitivity and providing the vertical transfer registers VR with the same width to thereby prevent transfer efficiency from decreasing. The apertures AP may therefore have a polygonal shape, a square lattice shape rotated by 45 degrees (e.g. rhombic) or even a hexagonal shape.

As also shown in FIG. 2, the color filter 28 has color filter segments CF each covering one of the apertures AP. The filter segments CF each are positioned just in front of a particular photodiode PD. Assume that the distance between nearby photodiodes PD is a pixel pitch PP. Then, the apertures AP are arranged in rows and columns that are shifted by the pixel pitch PP horizontally and vertically, as illustrated. When the apertures AP are polygonal, they may be more densely arranged in matching relation to the polygon. In such a case, apertures AP in rows and columns may be shifted from each other by one-half of the pixel pitch PP. For example, when the apertures AP are hexagonal, as shown in FIG. 2, they may be shifted by one-half of the pixel pitch PP ($|PP|/2$) in both of the horizontal and vertical directions. In this manner, the dense arrangement of the apertures AP depends on the shape of each aperture AP.

The configuration of the transfer electrodes is one of characteristic features of the illustrative embodiment. Briefly, in the illustrative embodiment, particular transfer electrodes are assigned to each of preliminary pickup and actual pickup. Specifically, as shown in FIG. 2, the first transfer electrodes $EL_1$ assigned to actual pickup each are formed at the bottom right of the respective photodiode PD. The second transfer electrodes $EL_2$ assigned to preliminary pickup each are formed at the top left of the respective photodiode PD on every third column. Stated another way, each transfer electrode $EL_2$ does not contact the vertical transfer path VR adjoining the associated photodiode PD via the transfer electrode $EL_1$, but contacts the vertical transfer path VR opposite to the above path VR with respect to the photodiode PD. Therefore, on the horizontal transfer path HR, actual pickup and preliminary pickup are shifted from each other by two packets as to the read-out position.

In the actual pickup mode, the drive signals V1, V3, V5 and V7 indicated by circles in FIG. 2 and containing the field shift gate pulses are applied to the transfer electrodes $EL_1$. On the other hand, the drive signals V2, V4, V6 and V8 indicated by triangles in FIG. 2 and containing the field shift pulses are applied to the transfer electrodes $EL_2$.

How the camera 10 operates when the shutter release button is pressed to its half-stroke position assigned to preliminary pickup will be described hereinafter. This operation is unique to the illustrative embodiment. FIG. 2 shows the image pickup device 30 in a preliminary pickup condition wherein signals are read out at high speed. First, before the condition of FIG. 2 occurs, signal charges are read out of the photodiodes PD arranged on odd-numbered columns. For this purpose, the timing signal generator 22a included in the timing signal feeding section 22 feeds field shift gate pulses only to the vertical drive signals V2, V4, V6 and V8. The drive signals V2, V4, V6 and V8 with the field shift gate pulses superposed thereon are applied to the electrodes $EL_2$, so that field shift gates associated with the electrodes $EL_2$ are turned on. As a result, signal charges are read out of the photodiodes PD on every third columns to the vertical transfer paths VR positioned at the left-hand side of the photodiodes PD.

The driver 22b sends four-phase vertical drive signals to the vertical transfer paths VR via the signal line 22c in order to transfer the signal charges along the vertical transfer paths VR. FIG. 2 shows a condition wherein the signal charges have been transferred from the vertical transfer paths VR to the horizontal transfer path HR by two packets of the paths VR. Despite that signal charges are read out of two lines at the same time and vertically transferred, the colors R, G and B can appear on the horizontal transfer path HR together without any color mixture. For this reason, horizontal transfer is effected two lines at a time. As also shown in FIG. 2, horizontal drive signals H1 through H6 each are applied to particular packets of the horizontal transfer path HR in order to effect horizontal transfer.

By the vertical transfer, the signal charges derived from simultaneous two-line read-out are positioned on the horizontal transfer path HR in a relation of "B,_,_,_,_,_, G,_,_,_,_,_, R,_,_,_,_,_,G,_,_,_,_,_,B, . . . ". It is to be noted that the symbol "_" is representative of a vacant packet where a signal charge is absent. The horizontal transfer path HR has a six-electrode structure, as stated earlier. As shown in FIG. 2, the signal charges are present in every sixth packet. It will therefore be seen that the transfer of the signal charges in a direction A shown in FIG. 2 is effected at a rate equivalent to one available with six-phase drive. More specifically, because six-phase drive usually transfers signal charges by one electrode (packet) in one-six of a single period, signal charges can be transferred by six electrodes (packets) in a single period. Therefore, two-phase drive originally effected, but at a rate equivalent to one available with six-phase drive, successfully triples the transfer rate without the reading frequency being varied.

Figure 3:
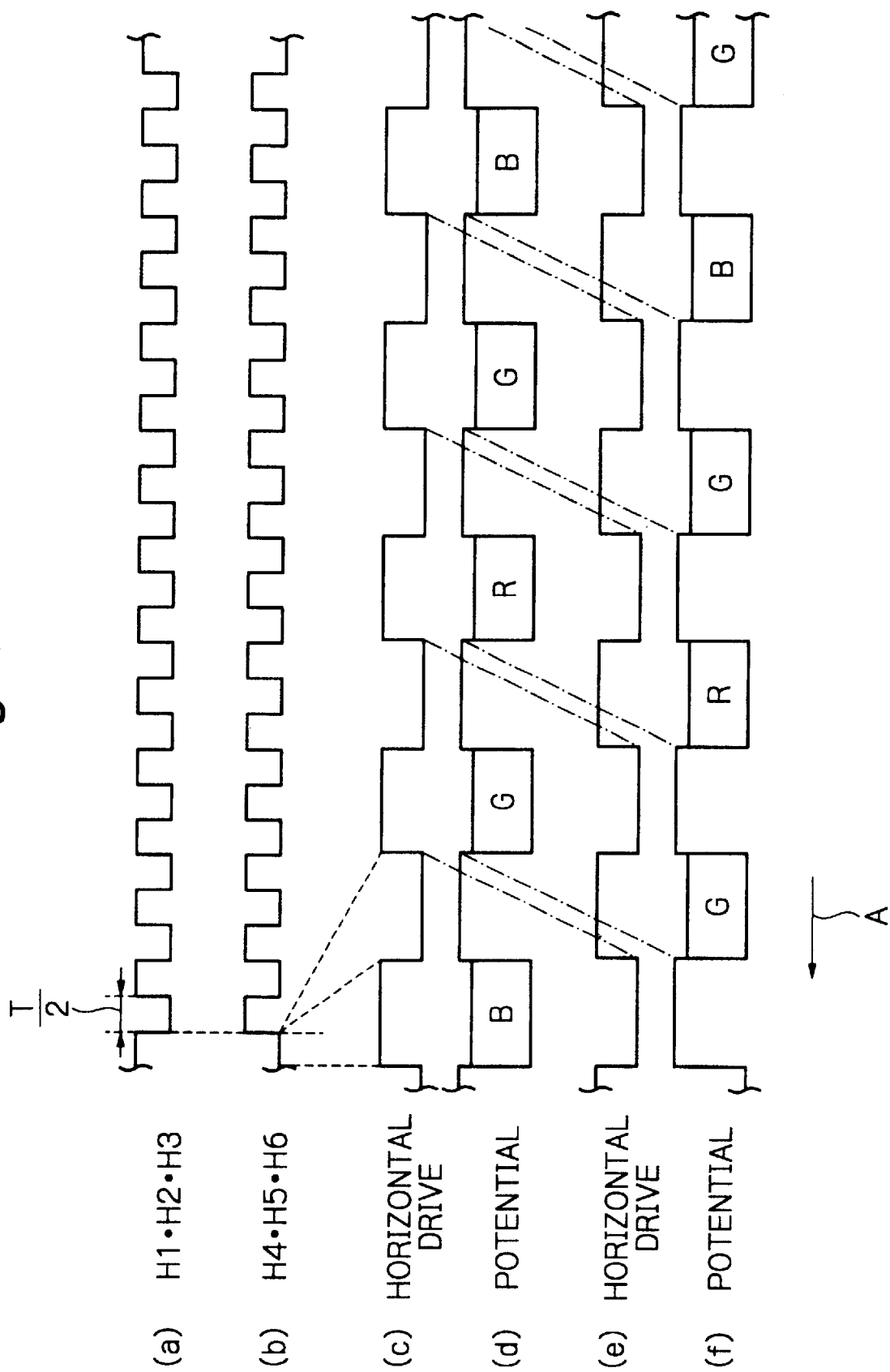
FIG. 3 shows the phases of the horizontal drive signals and the variation of potential wells formed by the drive signals.

The above-described relation will be described more specifically with reference to FIG. 3. As shown in FIG. 3, parts (a) and (b), the horizontal drive signals H1, H2 and H3 and the horizontal drive signals H4, H5 and H6 are opposite in phase to each other. Translating this relation into positions on the horizontal transfer path HR, a horizontal drive waveform shown in FIG. 3, part (c) is fed. Consequently, potential wells are formed in the consecutive packets in accordance with the level of the drive signal, as shown in FIG. 3, part (d). Subsequently, the horizontal drive waveform to be applied to three successive packets, which are spaced by half a period (T/2), is inverted in phase, as shown in FIG. 3, part (e). As a result, each signal charge moves over three packets at a time in the direction A, as shown in FIG. 3, part (f). Assuming that time expires from the left-hand side to the right-hand side in FIG. 3, parts (c) and (e), potentials vary and transfer signal charges, as shown in FIG. 3, parts (d) and (f).

As shown in FIG. 3, part (a), the horizontal drive signals H1, H2 and H3 are identical in level with each other and fed at the same timing in order to set up the same phase over one-half of the period. This is also true with the horizontal drive signals H4, H6 and H6, as shown in FIG. 3, part (b). Consequently, a potential well is formed over each three packets, causing the signal charges to be sequentially transferred on a three-packet basis. Therefore, the signal charges each are transferred over six packets in each period. It is therefore possible to read out the signal charges input to the horizontal transfer path HR at a tripled transfer rate simply by varying the timings of the horizontal drive signals while maintaining two-phase drive, i.e., without varying the reading frequency, as stated earlier.

For example, assume that the image pickup device 30 has 1,600 pixels in the horizontal direction and 1,200 pixels in the vertical direction, as prescribed by the UXGA (Ultra eXtended Graphics Array) standard that is the maximum size available with a display. Then, during preliminary pickup, signal charges are read out of only about 533 pixels, which is short of 640 pixels required of VGA (Video Graphics Array) However, considering the increasing demand for higher pixel density of the image pickup device 30, the high-speed reading with horizontal pixel reduction described above will surely contribute a great deal to future image pickup technologies.

In the illustrative embodiment, all the photodiodes PD on every third column are provided with the second transfer electrodes $EL_2$. Alternatively, the transfer electrodes $EL_2$ may be so formed as to receive only the vertical drive signals V2 and V4 or the vertical drive signals V6 and V8. This allows the pixels to be reduced to one-half in the vertical direction. Even reduction to one-four or one-eighth, for example, is achievable if vertical drive is effected with nearby transfer electrodes $EL_2$ being spaced in consideration of the simultaneous two-line read-out.

As stated above, the illustrative embodiment reduces the pixels to at least one-third in the horizontal direction in the preliminary pickup mode. This successfully reduces a period of time necessary for signal charges to be read out of the image pickup device 30 without varying the reading frequency. The above period of time can be further reduced if consideration is given to the interval between nearby transfer electrodes $EL_2$ with respect to vertical drive.

Figure 4:
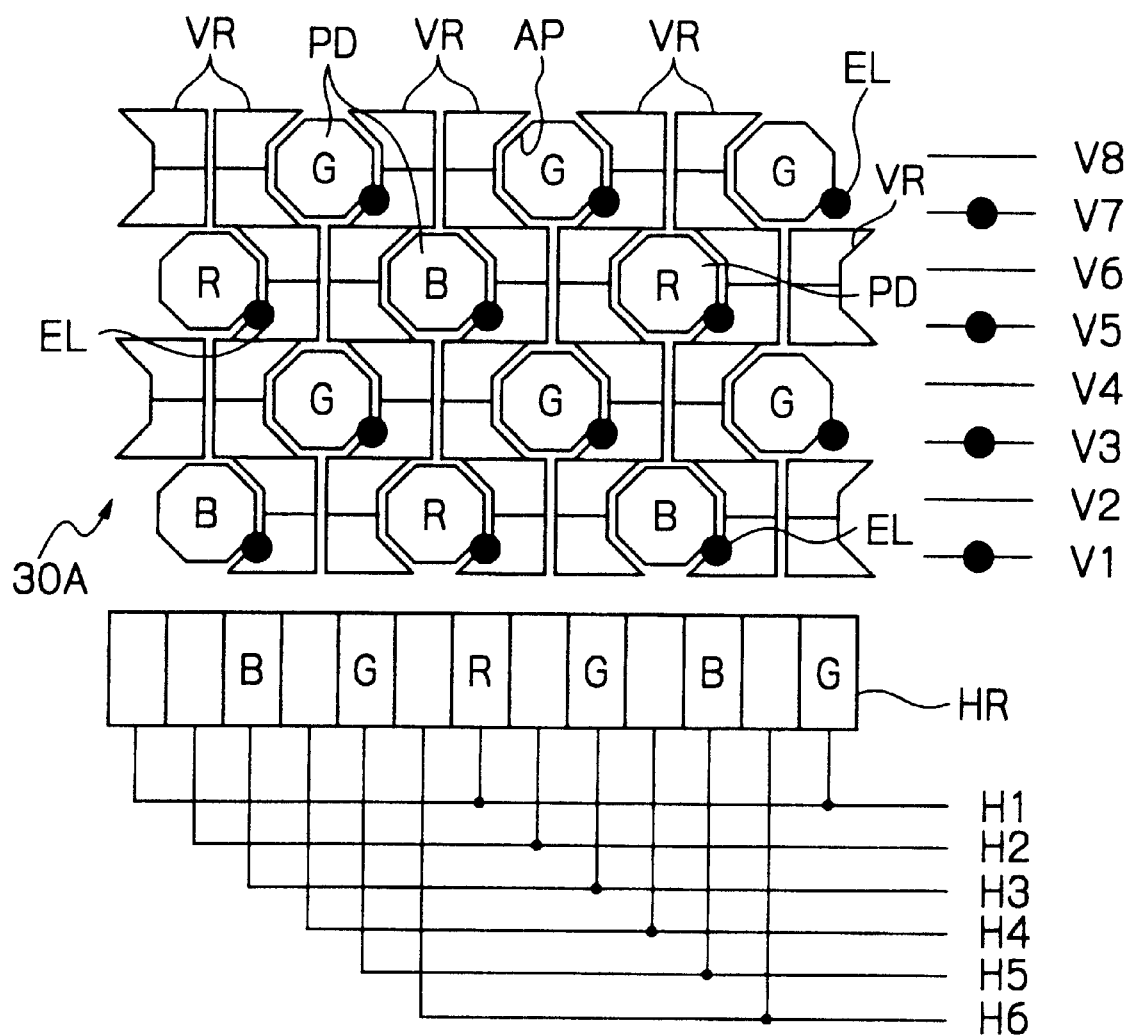
FIG. 4 is a schematic view showing the photosensitive array of an image pickup section included in a digital still camera, as seen from the light incidence side, together with a relation between signal charges transferred in the horizontal direction and a relation between horizontal drive signals.

For comparison, another arrangement for reading signal charges out of the image pickup device will be described with reference to FIGS. 4 and 5. As shown in FIG. 4, the image pickup device 30A differs from the image pickup device 30 of FIG. 2 in that it lacks the second transfer electrodes $EL_2$. As this difference indicates, the image pickup 30A does not allow signal charges to be reduced in the horizontal direction when they are read out, i.e., the preliminary pickup mode and actual pickup mode are basically identical with each other. It has been customary with the image pickup 30A to reduce pixels to, e.g., one-half or one-fourth in the vertical direction during preliminary pickup, thereby enhancing rapid read-out. For horizontal pixel reduction to one-half, the field shift gate pulses generated by the timing signal generator 22a are superposed on the vertical drive timing signals so as to produce the vertical drive signals V1 and V3 or V5 and V7. To read signal charges out of the photodiodes PD, the driver 22b feeds the vertical drive signals V1, V3, V5 and V7 to transfer electrodes or field shift gates EL. As a result, signal charges are read out via the transfer electrodes EL while being reduced to one-half.

Assume that the primary colors R, G and B are required to appear together on the horizontal transfer path HR even during preliminary pickup. Then, the simultaneous two-line read-out is effected. When signal charges are simply read out line by line, only the colors R and B or the color G is read out line by line in the horizontal direction. That is, the colors R, G and B do not appear together on a single line, obstructing adequate interpolation at the signal processing stage. FIG. 4 shows the horizontal transfer path HR in a condition wherein two lines are read out at the same time. The horizontal drive signals H1 through H6 each are fed to particular packets of the horizontal transfer path HR. As shown in FIG. 4, the horizontal transfer path HR has a six-electrode structure and transfers the signal charges by using a single packet as a barrier.

As shown in FIG. 5, parts (a) and (b), the arrangement performs two-phase drive in transferring signal charges on the horizontal transfer path HR. Specifically, the horizontal drive signals H1, H3 and H5 are fed in one phase while the horizontal drive signals H2, H4 and H6 are fed in the other phase. The horizontal drive signals H1, H3 and H5 generate potential wells, as shown at the top of FIG. 5, part (c). Subsequently, the horizontal drive signals H2, H4 and H6 are fed and cause the potential wells to move by one packet, as shown at the bottom of FIG. 5, part (d). Such a procedure is repeated to read two lines of signal charges as a single line. This kind of signal reading scheme, however, does not give consideration to pixel reduction in the horizontal direction and therefore needs, during preliminary pickup, a period of time three times longer than the period of time particular to the illustrative embodiment. By comparing FIG. 3, parts (d) and (f), and FIG. 5, parts (c) and (d), it will be seen that the potential wells particular to the illustrative embodiment move, for a given period of time (period), over a distance three times as great as the potential wells particular to the arrangement. That is, the transfer rate achievable with the illustrative embodiment is three times as high as the comparative transfer rate.

Assume that signal charges are read out of only the odd-numbered rows or even-numbered rows, and that only the color G is used for photometry although it is not applicable to a color LCD. Then, the pixels can be reduced only to one-half in the horizontal direction, so that the horizontal transfer rate is simply doubled.

During preliminary pickup, a long reading time ascribable to priority given to image quality is not desirable from the operation standpoint. For example, if the preliminary pickup is slow, then the operator cannot set up pickup conditions at a desired timing before actual pickup and must, in the worst case, simply wait without any shot.

As stated above, in the illustrative embodiment, the camera 10 includes additional transfer electrodes formed in consideration of the honeycomb pattern of the filter 28 for reading out signal charges during preliminary pickup. The timing signal feeding section 22 feeds timing signals, or field shift gate pulses, to the image pickup device 30 at a particular timing to each of the additional transfer electrodes and conventional transfer electrodes. As a result, signal charges are selectively read out in the horizontal direction during preliminary pickup, i.e., the pixels are reduced in the horizontal direction. Specifically, in the case of a G square, RB full-checker pattern, the horizontal drive signals are fed such that when the signal charges are transferred along the horizontal transfer path HR, having six-electrode structure, each three packets form the same potential (well). The signal charges can therefore be read out by two-phase drive as if they were read out by six-phase drive, without the reading frequency being varied. This triples the horizontal transfer rate and therefore prevents the operator from, e.g., missing a shutter chance at the time of actual pickup despite that the image pickup device 30 has high pixel density. The illustrative embodiment therefore frees the operator from uneasiness and insures high image quality.

In summary, in accordance with the present invention, a solid-state image pickup apparatus includes exclusive transfer electrodes assigned to preliminary pickup in addition to conventional transfer electrodes. During preliminary pickup, signal charges are read out of photodiodes through the additional transfer electrodes and transferred to vertical transport paths adjoining the above photodiodes in accordance with drive signals output from a signal feeding section. As a result, the signal charges are read out while being reduced to 1/(interval between nearby additional transfer electrodes+1), i.e., at least to one-third in the horizontal direction. The signal charges or image data so read out are transferred along a horizontal transfer path. The signal feeding section feeds horizontal drive signals adjusted in timing to the horizontal transfer path, causing the above image data to be read out without varying reading frequency. This at least triples the horizontal transfer rate and therefore prevents the operator from, e.g., missing a shutter chance at the time of actual pickup despite that an image pickup device has high pixel density. The present invention therefore frees the operator from uneasiness and insures high image quality.

More specifically, assume that the additional transfer electrodes, as distinguished form the conventional transfer electrodes, are assigned to the photodiodes arranged on every third column. Then, during preliminary pickup, the signal charges or pixel data read out are reduced to 1/(two columns+1), i.e., one-third. Such signal charges are transferred form the vertical transfer paths to a single horizontal transfer path while the colors R, G and B are held in the same relation as during actual pickup. This is successful to achieve the above-described advantage.

The entire disclosure of Japanese patent application No. 253904/1999 filed Sep. 8, 1999 including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A solid-state image pickup apparatus comprising:
    an image pickup section; and
    a signal feeding section;
    said image pickup section comprising:
        photosensitive cells arranged bidimensionally, each being shifted from adjoining photosensitive cells in a horizontal and a vertical direction for photoelectrically transducing incident light;
        a color filter having color filter segments, each being positioned in front of a particular photosensitive cell in a direction of light incidence for separating colors of incident light representative of a scene;
        first transfer electrodes, each being assigned to a particular photosensitive cell for reading out a signal charge generated by said photosensitive cell; and
        second transfer electrodes, each being assigned to a particular photosensitive cell arranged on at least every third column in a horizontal direction for reading out a signal charge generated by said photosensitive cell;
    wherein said solid-state image pickup apparatus sequentially performs preliminary pickup and actual pickup, which reads all of the signal charges out of said photosensitive cells, and executes digital signal processing with resulting signals; and
    wherein said signal feeding section feeds transfer timing signals for transferring, during the preliminary pickup, signal charges output from said photosensitive cells arranged on at least every third column via said second transfer electrodes to vertical transfer paths, vertical drive signals for transferring said signal charges along said vertical transfer paths toward a horizontal transfer path perpendicular to said vertical transfer paths, and horizontal drive signals adjusted in timing for transferring the signal charges along said horizontal transfer path while maintaining a color of an individual signal charge.

2. An apparatus in accordance with claim 1, wherein said second transfer electrodes each adjoin one of said vertical transfer paths adjoining a respective photosensitive cell, but at such a position that the signal charge is read out of said respective photosensitive cell at a different timing from the signal charge read out of said first transfer electrodes.

3. An apparatus in accordance with claim 1, wherein when said color filter comprises a primary color filter, said primary color filter has a G (green) square lattice, RB (red and blue) full-checker pattern in which G filter segments are arranged in a square lattice pattern while R filter segments and B filter segments are alternately arranged at positions surrounded by nearby ones of said G filter segments, and wherein the filter segments diagonally opposite to each other with respect to each of said G filter segments are of a same color.

4. An apparatus in accordance with claim 3, wherein said signal feeding section outputs said transfer timing signals to cause the signal charges to be read out via said second transfer electrodes during the preliminary pickup, wherein said vertical drive timing signals are fed to said horizontal transfer path one line or two lines at a time, wherein said horizontal drive signals applied to said horizontal transfer path simultaneously form a potential well in each two packets adjoining a packet storing the signal charge, and wherein drive signals derived from said transfer timing signals, said vertical drive signals and said horizontal drive signals are fed to said image pickup section.

5. An apparatus in accordance with claim 4, wherein said drive signals provide each three packets with a same drive phase on the basis of an electrode structure of said horizontal transfer path.

6. An apparatus in accordance with claim 5, wherein when said horizontal transfer path has a six-electrode structure, said drive signals drive, based on the signal charges read out of every third column during preliminary pickup, said horizontal transfer path by two-phase drive by using one-half of six packets as a transfer carrier.

7. A signal reading method of reading signal charges generated by photosensitive cells, which are arranged bidimensionally and each is shifted from adjoining photosensitive cells in a horizontal and a vertical direction for photoelectrically transducing light of particular separated color incident thereto, in a particular manner for each of preliminary pickup and actual pickup, which reads all of said signal charges out of said photosensitive cells for recording said signal charges, said signal reading method comprising the steps of:
    (a) preparing first transfer electrodes each being assigned to a particular photosensitive cell for reading out a signal charge generated by said photosensitive cell;
    (b) preparing second transfer electrodes each being assigned to a particular photosensitive cell arranged on at least every third column in a horizontal direction for reading out a signal charge generated by said photosensitive cell;
    (c) generating drive signals for reading out signal charges generated by said photosensitive cells and representative of a shot;

(d) rendering, during the preliminary pickup, only said second transfer electrodes conductive with the drive signals generated in said step (c) to thereby reduce pixels in the horizontal direction;

(e) vertically transferring the signal charges read out via said second electrodes in said step (d) with said drive signals generated in said step (c); and (f) horizontally transferring the vertically transferred signal charges with said drive signals generated in said step (c) and adjusted in timing.

8. A method in accordance with claim 7, wherein use is made of a primary color filter for color separation, said primary color filter has a G square lattice, RB full-checker pattern in which G filter segments are arranged in a square lattice pattern while R filter segments and B filter segments are alternately arranged at positions surrounded by nearby ones of said G filter segments, wherein the filter segments diagonally opposite to each other with respect to each of said G filter segments are of a same color, and wherein said drive signal generated in said step (c) cause the signal charges to be read out during the preliminary pickup in a same sequence as during the actual pickup as to color information on the basis of said G square lattice, RB full-checker pattern.

9. A method in accordance with claim 7, wherein said step (f) comprises the step (g) of generating, during the preliminary pickup, horizontal drive timing signals for simultaneously forming a well in each two packets adjoining a packet storing a signal charge in the horizontal direction.

10. A method in accordance with claim 7, wherein said drive signals assigned to said step (f) provide each three consecutive packets with a same phase with respect to phase drive signals used to transfer the signal charges and execute two-phase drive with said three packets.

11. A method in accordance with claim 10, wherein when two-phase drive signals are used for usual horizontal transfer, said step (f) comprises the step (h) of using, based on the signal charges read out of every third column during preliminary pickup, one-half of six packets as a transfer carrier and executing two-phase drive with said six packets.

* * * * *